United States Patent [19]
Reilly

[11] 3,873,942
[45] Mar. 25, 1975

[54] UNSTABLE OPTICAL RESONATOR
[75] Inventor: James P. Reilly, Lexington, Mass.
[73] Assignee: Avco Everett Research Laboratory, Inc., Everett, Mass.
[22] Filed: Aug. 20, 1973
[21] Appl. No.: 390,119

[52] U.S. Cl. .......................................... 331/94.5 C
[51] Int. Cl. ............................................. H01s 3/08
[58] Field of Search ................................. 331/94.5

[56] References Cited
UNITED STATES PATENTS
3,466,566  9/1969  Patel ................................. 331/94.5
3,573,656  4/1971  Marcatili ........................... 331/94.5

Primary Examiner—William L. Sikes
Attorney, Agent, or Firm—Charles M. Hogan; Melvin E. Frederick

[57] ABSTRACT
Herein described is an unstable resonator cavity for a laser having a primary reflection surface at one end of the cavity that intercepts the optical axis of the cavity and a feedback reflection surface at the other end of the optical cavity that does not intercept the optical axis of the cavity such that obscuration of the output radiation from the cavity along the axis thereof is eliminated. The primary and feedback reflection surfaces are shaped to reflect radiation within the cavity which is initially substantially parallel to the cavity axis at the extreme lateral edges of the reflection surfaces so that radiation progressively moves from the extreme lateral edges toward the optical axis upon repeated reflections between these surfaces until this radiation clears the inside edge of the feedback reflector and escapes from the optical cavity as output radiation. Thus, all radiation escaping from the optical cavity which becomes output radiation is through a totally unobscured radiation opening centered on the optical axis. And so, a relatively high proportion of the output radiation when focused may be centered on an axis which coincides with the axis of the optical focusing system.

9 Claims, 8 Drawing Figures

PRIOR ART

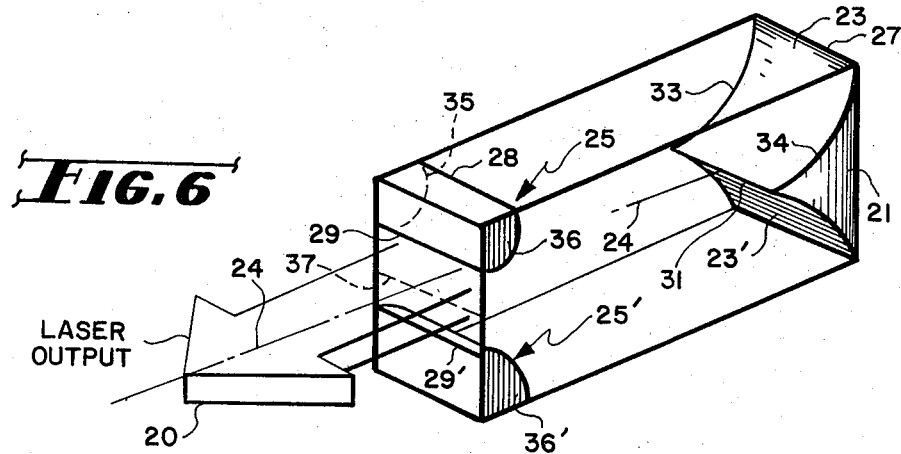
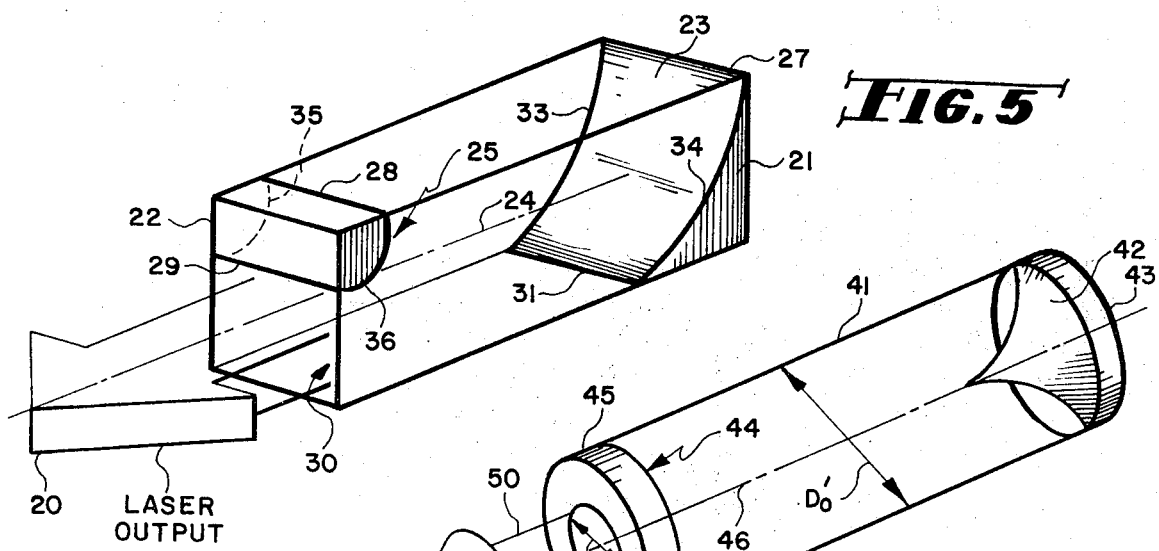
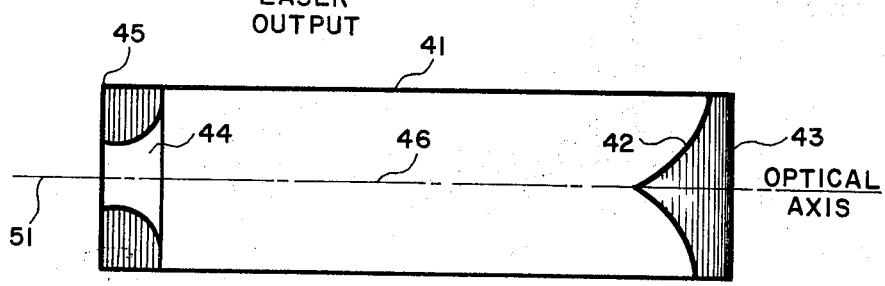

3,873,942

UNSTABLE OPTICAL RESONATOR

BACKGROUND OF THE INVENTION

This invention relates to lasers and more particularly to unstable resonator cavities for a laser such as a gas laser wherein the laser action takes place and from which an output laser beam emerges.

A conventional unstable resonator cavity in a laser such as a gas laser includes a primary reflection surface at one end of the cavity and a feedback reflection surface at the other end of the cavity. In the usual aligned configuration, both reflection surfaces are centered on the cavity axis. Furthermore, the center of curvature of both reflection surfaces of such unstable resonators define the optical axis of the cavity and these centers of curvature for the primary reflection surface generally lie on the side thereof toward the output of the laser. This arrangement is such that any ray of radiation along the optical axis, upon repeated reflection between the primary and feedback reflection surfaces will progressively move away from the optical axis of such conventional resonators and eventually clear the outer edge of the feedback mirror and escape from the cavity as output radiation. In other words, the ray initially along the optical axis will "walk out" of the optical cavity and for this reason the optical cavity is referred to as an "unstable" cavity or resonator.

The output laser beam from the unstable resonator cavity of the sort described above (if it is close to equiphase across its cross section), exhibits a Fraunhoffer pattern when its far field is examined in cross section. The Fraunhoffer pattern is produced when a light beam of uniform phase front across the beam is either examined far from its source, or brought to a focus. The typical Fraunhoffer pattern from a circular laser aperture exhibits a light disc at the center of the beam encircled by a dark ring which is in turn encircled by a light ring that is in turn encircled by a dark ring, etc. The total radiation flux or power which can be extracted from the laser medium is a function of the total flux within the optical cavity, the small signal gain or the cavity conditions, the cavity length, and the transmission or coupling factor of the feedback mirror from the cavity to the output beam. Clearly, for a given laser medium, pressure and temperature, length and input power, the output power or output flux is a function of the feedback mirror transmission coefficient. It can be shown that the laser output power for the given laser peaks at some coupling factor and tapers off to zero on either side of that peak. Since it is usually preferred to operate at the maximum output power, it is usually strived to design the optical cavity with a coupling factor at the peak of the curve, because this results in the highest overall efficiency of the laser.

For the near field, it is usually desired to provide from a given laser, the highest output power for a given input power and so it is desired that the optical cavity be designed to provide the highest overall efficiency. As a rule, it is not of critical importance for near field power extraction that the distribution of radiation power, if focused, is spread over several of the light Fraunhoffer rings in the output radiation pattern. For near field power extraction, the problem is simply to get as much power as possible out of the laser for given input power. However, some laser applications require that not only high near field power extraction be obtained, but also that when focused there be a maximum fraction of extracted power at the center of the beam along the beam axis. In other words, in these cases it may be most desirable to maximize the on axis flux density of the laser beam. This would be accomplished by getting as high a proportion as possible of the total beam energy into the center of the beam inside of the first dark ring of the Fraunhoffer pattern.

Heretofore, these two purposes (1) getting as much power as possible out of the laser, and (2) getting as high a proportion of the beam energy along or on the axis of the beam when focused have raised a conflict in design. If one uses conventional unstable resonator design such as described above and selects the coupling factor where the peak occurs in the curve of coupling factor versus output power for the given laser, one finds that the coupling factor at the peak must fall in a certain intermediate range between maximum and minimum and beyond that range the output power drops off to zero. One also finds that the selected coupling factor realizes a substantial obscuration of the emerging output beam along the axis of the cavity and this obscuration tends to reduce the proportion of the total output radiation within the first dark Fraunhoffer ring. With a conventional unstable resonator design, any decrease in the obscuration to increase the on axis intensity of the output beam also results in reducing the total output power of the beam, all else being equal.

SUMMARY OF THE INVENTION

In accordance with principal features of the present invention, an unstable resonator cavity of a gas laser is provided such that there is substantially zero obscuration of the output beam along the optical axis of the cavity and the beam. At the same time, however, the coupling factor of the feedback reflection surface at the output of the resonator cavity can be tailored to produce the maximum output power for the given laser operated at a given level of input power. In accordance with the present invention, this is accomplished using primary and feedback reflection surfaces at opposite ends of the optical cavity such that the feedback reflection surface does not intercept any radiation along the cavity axis and both these reflection surfaces are contoured so that a beam of radiation in the cavity parallel to the cavity axis at the extreme lateral edges of the reflection surfaces progressively moves toward the optical axis of the cavity upon repeated reflections between these surfaces, until the beam of radiation clears the inside edge of the feedback mirror and escapes from the optical cavity as output radiation. Thus, the escaping radiation that forms the output beam escapes from the cavity through a central radiation opening in the feedback mirror rather than through an annular opening at the outer periphery of the feedback mirror. Various embodiments of the present invention provide a primary reflection surface or mirror located on the axis of the optical cavity and tapering with respect to the axis toward the feedback mirror. Furthermore, the feedback reflection surface or mirror is located off the optical axis and tapers with respect to the axis in the same direction as the primary reflection surface. In preferred embodiments, the reflection surfaces are curved.

The shape of the primary reflection surface or mirror may be simply a sloped reflection surface which slopes at all points on this reflection surface in the same direction relative to the line of the optical cavity and the same is true of the feedback reflection surface. Another embodiment is substantially the same and includes a second primary reflection surface and a second feedback reflection surface which are mirror images of the first with respect to a plane containing the optical axis of the cavity.

Another embodiment provides a cusp-shaped primary mirror with the axis of the cusp coincident with the optical axis of the cavity and a toroidal shaped feedback mirror also concentric with the cavity axis. In this embodiment, the output laser beam emerges from the center of the toroid.

It is an object of the present invention to provide an improved unstable resonator cavity for a laser having primary and feedback mirrors at opposite ends of the cavity, the output laser radiation emerging from the cavity adjacent the feedback mirror.

It is another object of the present invention to provide an unstable resonator cavity for a laser such that maximum output power from the laser can be obtained for given input conditions without obscuring the center of the beam along the cavity optical axis.

It is another object to provide an unstable resonator cavity for a laser using simple mirror surfaces at each end of the cavity which curve in only one plane and a feedback mirror causing substantially no obscuration of the output beam along the cavity axis.

It is another object to provide a laser beam for which the intensity of radiation across the beam defines a Fraunhoffer pattern at the focus of the beam containing a relatively high proportion of the total power of the beam within the first dark ring of the focused pattern.

It is a further object to provide means for increasing the amount of total radiation power in a laser beam contained in the first dark ring of the diffraction pattern of the beam produced in the far field.

It is a further object to provide means for increasing the amount of total power in a laser beam contained in the first dark ring of the diffraction pattern of the beam while at the same time maintaining the coupling coefficient of the feedback mirror such as results in maximum output power from the laser for the conditions of operation of the laser.

These and other objects and features of the present invention will be more apparent from the following description of the specific embodiments which represent the best known uses of the invention.

DESCRIPTION OF THE DRAWINGS

FIG. 5 illustrates a simple configuration of primary and feedback mirrors for an unstable resonator cavity incorporating features of the present invention;

FIG. 6 illustrates another embodiment of the present invention, similar to the embodiment illustrated in FIG. 5 and in which additional primary and feedback reflection surfaces and provided which are a mirror image of the surfaces shown in FIG. 5 with respect to a plane parallel to the cavity axis; and FIGS. 7 and 8 illustrate the configuration of mirrors in a third embodiment of the present invention wherein the primary and feedback mirror surfaces are figures of revolution about the cavity axis.

DESCRIPTION OF EMBODIMENTS OF THE INVENTION

Figure 1:
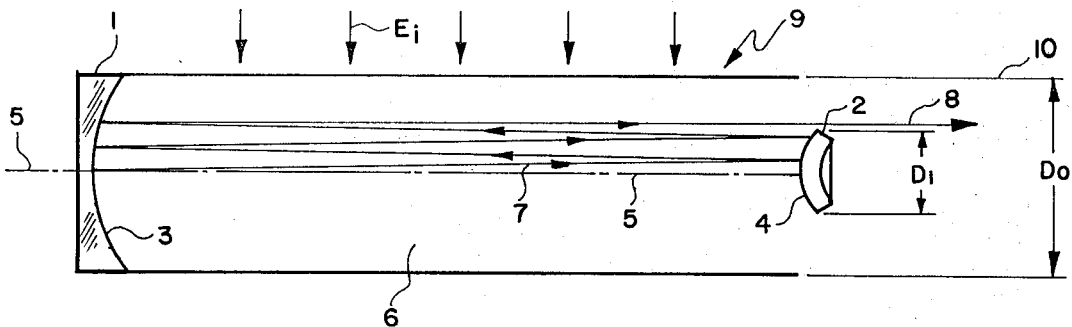
FIG. 1 shows the primary and feedback mirrors of a conventional unstable laser cavity wherein the feedback mirror obscures the output laser beam along the cavity axis and so this figure represents the prior art.

Turning first to FIG. 1 there is shown a representation of a conventional unstable optical resonator cavity for a gas laser. The cavity is defined by the primary mirror 1 and the feedback mirror 2. The primary mirror provides a concave reflection surface 3 and the feedback mirror provides a convex reflection surface 4. The centers of curvature of both of these reflective surfaces lie on the optical axis 5 of the cavity. In operation, the medium 6 which may be a gas or a mixture of gases such as, for example, a mixture of $CO_2$, $N_2$ and He, are pumped by input energy represented as $E_i$ which produces a population inversion of energy states in the gas accompanied by the spontaneous emission of radiation and this radiation is amplified within the medium by laser action. Any ray of the radiation such as represented by ray 7 along the axis 5 of the cavity and slightly inclined thereto will reflect back and forth between the primary and feedback reflection surfaces 3 and 4 and in so doing will be amplified and will move away from the axis and escape from the cavity as ray 8 becoming part of the output laser beam 10. Thus, the ray which begins along the axis of the cavity will walk out of the cavity and escape never to return. Clearly, the direction of progressive positions of the ray beginning along the axis 5 is from the axis to the outer periphery of the feedback mirror and escape occurs when the ray is positioned beyond the outer periphery of the feedback mirror. Since every given ray escapes from the optical cavity, the cavity is known as an unstable cavity or resonator.

Figure 2:
FIG. 2 shows the typical Fraunhoffer pattern of radiation of the focus of the output laser beam in the conventional structure.

The intensity pattern of radiation transverse to the beam 10 defines a Fraunhoffer pattern as shown in FIG. 2. This pattern consists of concentric light and dark rings, the center being a disc of light. This type of pattern is generally produced for any beam of constant phase front which is blanked or obscured along the center of the beam at its optical axis. Generally, the amount of coupling of energy or power from the optical cavity 9 to the output beam 10 is represented by the feedback mirror coupling coefficient $L_c$. This coupling coefficient is given approximately by the ratio of the area of the annulus of the beam defined by dimension $D_o$ (see FIG. 1) to the area of the beam. More particularly, $L_c$ (for circular mirrors) is given as follows:

$$L_c = \frac{D_o^2 - D_f^2}{D_o^2}$$

Figure 3:
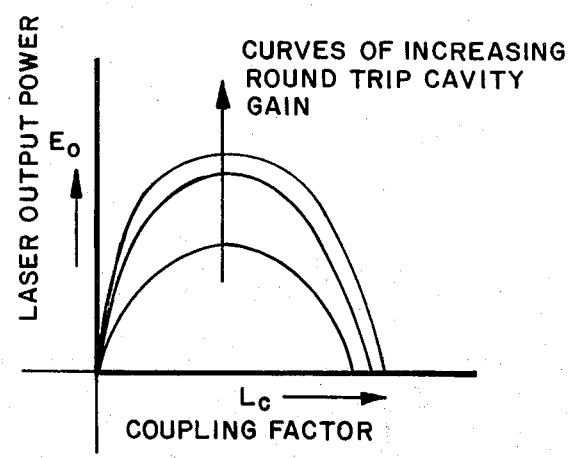
FIG. 3 is a plot of feedback mirror coupling factor $L_c$ versus beam output power $E_o$ for a number of conventional lasers of the sort shown in FIG. 1 each operated at constant input power to show how power peaks as a function of the coupling factor.

A plot of the coefficient $L_c$ versus $E_o$ for several conventional gas laser configurations such as represented in FIG. 1 are shown in FIG. 3. As can be seen, the amount of power that can be obtained from a given laser configuration under prescribed conditions of operation is a function of the coupling factor $L_c$ and this power peaks at some value tapering off to zero on either side of the peak.

Figure 4:
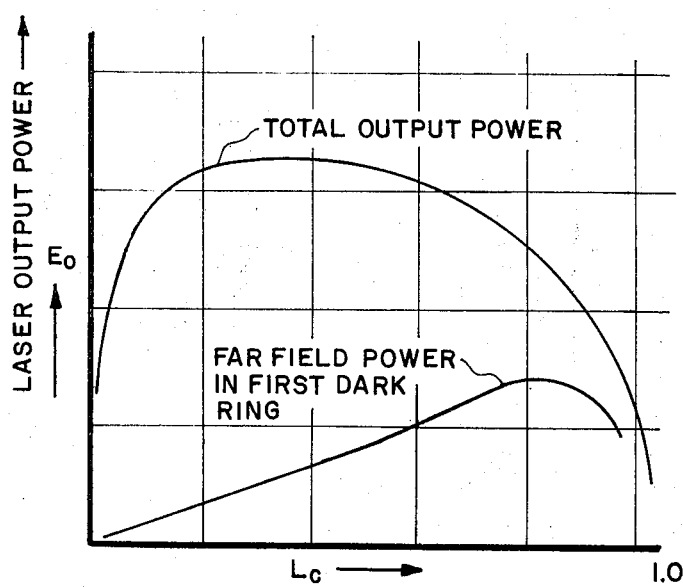
FIG. 4 is a plot of feedback mirror coupling factor $L_c$ versus output laser beam power in the first dark ring of the Fraunhoffer pattern of the beam, for the near field and far field of a given conventional laser to illustrate the dependence of this on $L_c$.

The total output power of the laser plotted in FIG. 3 is the power distributed in the light rings of the Fraunhoffer pattern shown in FIG. 2. The portion of that power that is inside the first dark ring (in the central light disc) is a function of the amount of obscuration of the beam along the axis 5 caused by the feedback mirror. If the obscuration were minimized by making the feedback mirror diameter $D_1$ very small, then clearly the coupling factor $L_c$ would be increased beyond the value of $L_c$ at which the output power peaks and this of course would result in less output power. FIG. 4 is a plot of a typical one of the curves of $L_c$ versus output power from FIG. 3 for comparison with a plot of the relatively far field energy within the first dark ring of the Fraunhoffer pattern versus $L_c$. As can be seen, the value of $L_c$ which produces the maximized output power for the case analyzed is between 0.2 and 0.4 while the value of $L_c$ resulting in the greatest power within the first dark ring of the diffraction pattern lies between 0.8 and 0.9. Hence, for this conventional laser configuration, any selected value of $L_c$ is a compromise and will neither realize the maximum total output power nor the greatest concentration of energy in the central light disc of the Fraunhoffer pattern.

Several mirror configurations incorporating features of the present invention are illustrated by FIGS. 5 to 8. These configurations impose substantially no obscuration or blanking of the output laser beam along the optical axis of the laser cavity. At the same time, these configurations accommodate an optical design which provides a coupling coefficient $L_c$ such that total output power from the laser can be maximized. As a result, the brightness of the far field or focused energy of the laser beam can be maximized.

The far field intensity of a laser beam is specified by the on axis flux intensity of the beam and the energy contained within the first dark ring of the focused Fraunhoffer pattern. Thus, the far field focused energy intensity can be maximized by increasing the on axis intensity of the beam and increasing the energy contained within the first dark ring of the beam Fraunhoffer pattern. The optical configuration of the present invention illustrated by FIGS. 5 to 8 tends to maximize both the near field flux intensity of the output beam and the far field proportion of total beam energy contained within the first dark ring of the focused Fraunhoffer pattern. Thus, this optical structure is particularly effective to provide high central beam intensity of a laser beam in the far field at the same time providing maximized device power output (i.e., maximum efficiency).

The structure shown in FIG. 5 shows an optical cavity defined by a generally wedged shaped primary mirror 21 and a generally cylindrically shaped feedback mirror 22. The primary mirror provides a primary reflection surface 23 which is sloped with respect to the cavity optical axis 24. The feedback mirror provides a feedback reflection surface 25 which also slopes with respect to the optical axis 24. Here, both reflection surfaces may define the surface of cylinders, the diameter of the cylinder defined by the primary reflection surface 23 being greater than the cylinder defined by the feedback reflector surface 25. Furthermore, the feedback reflection surface 25 does not intercept the optical axis 24 and is positioned clear of that axis so that it does not obscure on axis radiation of the output laser beam 20 which issues from the cavity.

The primary and feedback reflection surfaces 23 and 25 in FIG. 5 are essentially parallel to each other in directions transverse to the optical axis 24 and where these surfaces define the surfaces of cylinders of different diameters, the axes of those cylinders are parallel and also transverse to the optical axis 24 of the cavity. Surfaces 23 and 25 might be made non-parallel to, for example, enhance mode selection. Furthermore, it is preferred that the cylindrical surfaces defined by the primary and feedback reflection surfaces both be essentially tangential to planes perpendicular to the optical axis of the cavity at the peripheries 27 and 28 of these surfaces so that the ray of radiation within the cavity incident perpendicular to these peripheries upon repeated reflections between the surfaces will progressively move toward the axis 24 of the cavity and escape past the inside edge 29 of the feedback surface. Thus, the escaping laser beam output 20 is immediately adjacent the periphery 29 of the feedback reflection surface 25 and may occupy only the output area 30 at the feedback end of the optical cavity. Substantially none of the output laser beam 20 is formed by radiation which escaped outside of the periphery 28 of the feedback mirror. The area 30 is defined by four planes parallel to the axis of the cavity, one containing the periphery line 29, another plane parallel to that one containing the periphery line 31 of the primary reflection surface and two planes transverse to those containing the side edges of the primary and feedback reflection surfaces. The side edges of the primary reflection surface 23 defined by curve lines 33 and 34 and the side edges of the feedback reflection surface 25 are defined by curved line 35 and 36.

The configuration shown in FIG. 6 is similar to the configuration in FIG. 5 and includes additional primary and feedback reflection surfaces 23' and 25' which are mirror images of the reflection surfaces 23 and 25 with respect to a plane containing the optical axis 24, peripheral edge 31 of the primary reflection surface and broken line 37 which is midway between and parallel to the peripheral edges 29 and 29' of the feedback reflection surfaces 25 and 25'. In this optical configuration shown in FIG. 6, the various parts which are mirror images of each other in that plane bear the same reference number; however, one number is with prime and the other is without.

The optical configuration illustrated in FIG. 6 as described above can be viewed as two of the configurations showing FIG. 5 arranged face to face. Both of these configurations show an elongated rectangular or parallel piped shaped optical cavity with primary and feedback mirrors at opposite ends. In FIG. 5, the feedback mirror is along only one edge of the output end of the cavity and in FIG. 6, the feedback mirrors are along the opposite edges of the output end of the cavity. In both of these, of course, the cavity axis and output beam axis are coincident and completely unobscured at the output end of the cavity. The next step from the embodiment shown in FIG. 6 is to provide feedback reflection surfaces along all four edges of the output end of the cavity, still without obscuring the output radiation along the output beam axis. Such an embodiment is not shown here, however, it can be easily envisioned and would provide reflecting surfaces such as 25 and 25' along all four edges of the output end of the cavity and separate sloping primary surfaces sloping such as the primary surfaces 23 and 23' would be provided for each of the feedback surfaces. Going a step further, the square cavity configuration can be rounded to define a cylinder in which case, the primary reflection surface will define a cusped shaped cone while the feedback reflection surface will define a portion of a toroid. This optical configuration is illustrated in FIGS. 7 and 8.

The cylindrical cavity 41 shown in FIGS. 7 and 8 is defined by the primary reflection surface 42 of the primary mirror 43 at one end of the cavity and the feedback reflection surface 44 of the feedback mirror 45 at the other end of the cavity. The output laser beam 50 emerges along the cavity axis 46 and in the near field is the same cross dimension $D_1$, as the inside diameter of the feedback toroid mirror.

The coupling factor $L_c$, of the mirror configuration shown in FIGS. 7 and 8 can be expressed approximately in terms of feedback toroid mirror inside diameter $D'_1$ and the diameter $D'_0$ of the cavity which is also the same as the outer peripheral diameter of the primary reflection surface 42 and the outer peripheral diameter of the feedback reflection surface 44. This coupling factor $L_c$ for circular cross section mirrors is expressed as follows:

$$L_c = \frac{D'_1}{D'_0}{}^2$$

The optical configuration described herein incorporating features of the present invention all illustrate an unstable resonant laser cavity having a primary reflection surface at one end which slopes relative to the cavity axis and a feedback reflection surface at the other end which also slopes relative to the cavity axis and does not obscure the emerging laser beam along the axis. The precise contours of the sloping and primary and feedback reflection surfaces are preferably such that a ray of radiation within the cavity directed substantially parallel to the cavity axis and aligned with the outer peripheries of the primary and feedback reflection surfaces, will upon repeated reflections between those surfaces progressively move from the outer periphery toward the cavity axis and eventually emerge from the cavity when the beam clears the inner edges or periphery of the feedback reflection surface. It is within the state of the art to precisely shape, dimension and locate the primary and feedback reflection surfaces with respect to each other in the cavity to accomplish this effect in a number of different ways. In other words, the exact formulation of the contour of the primary and feedback reflection surfaces can be varied considerably to accomplish the described effect on the ray of radiation.

One suitable contour for these reflection surfaces is that they are predominantly cylindrical, the diameter of the cylinder defined by the primary reflection surface being substantially greater than the diameter of the cylinder defined by the feedback reflection surface. It is also suitable that the feedback surface define a substantially greater portion of its cylindrical arc than the primary surface. Furthermore, in FIG. 5, for example, the cylindrical surfaces defined by the primary and feedback reflection surfaces at their outer peripheries 27 and 28, respectively, are optically parallel in as much as they define at these points optically parallel planes which are perpendicular to the cavity axes.

Clearly, the precise contour of the primary and feedback reflection surfaces and the dimensions and orientation of these surfaces will determine how many times a ray of radiation that begins at the outer peripheries of these surfaces reflects back and forth between these surfaces before it escapes from the optical cavity as part of the output laser beam.

The embodiments described herein illustrate a few examples of these configurations. Other configurations could be substituted to accomplish the same effect without deviating from the spirit and scope of the invention as set forth in the appended claims.

What is claimed is:

1. An unstable optical cavity having an optical axis comprising,
   a primary reflection surface at one end of the cavity,
   a feedback reflection surface at the other end of the cavity,
   the primary surface intercepting the axis and tapering with respect to the axis toward the feedback surface, and
   the feedback surface being located so as not to intercept the axis and tapering with respect to the axis in the same direction as the primary surface.

2. An unstable optical cavity as in claim 1 wherein, both reflection surfaces are curved.

3. An unstable optical cavity as in claim 1 wherein, both surfaces define curved lines at the intersection of said surfaces with a plane containing the optical axis.

4. An unstable optical cavity as in claim 1 wherein, the intersection of the primary surface with a plane containing the optical axis defines a cusp, and the intersection of the feedback surface with the same said plane defines two lines which do not cross the optical axis.

5. An unstable optical cavity as in claim 4 wherein, the primary and feedback surfaces are both curved in the direction perpendicular to said plane.

6. An unstable optical cavity as in claim 4 wherein, the axis of said cusp is coincident with the optical axis.

7. An unstable optical cavity as in claim 6 wherein, both surfaces are figures of revolution about the optical axis.

8. In a laser including an optical cavity having an optical axis,
   a primary reflection surface at one end of the cavity and a feedback reflection surface at the other end of the cavity, whereby output radiation is that radiation from within the laser which reflects from the primary surface toward the feedback surface, but is not intercepted and reflected by the feedback surface,
   a relatively high proportion of said output radiation being concentrated along the optical axis,
   the said primary surface tapering with respect to said optical axis toward said feedback surface, and said feedback surface tapering with respect to said optical axis in the same direction as said primary surface, the said primary and feedback reflection surfaces forming an unstable optical cavity system wherein the feedback surface does not obscure the output radiation along the axis and a ray of radiation substantially parallel to the axis impingent upon the surfaces at the outer peripheries thereof, upon repeated reflections within the cavity between the surfaces, progressively moves toward the optical axis and eventually escapes from the cavity as said output radiation.

9. A laser as in claim 8 wherein,
the primary surface defines substantially a cusp and the feedback surface defines substantially at least a part of a toroid, the axis of the cusp and the axis of the toroid being substantially coincident.

* * * * *